(12) United States Patent
Nakayama et al.

(10) Patent No.: US 8,656,406 B2
(45) Date of Patent: Feb. 18, 2014

(54) LOAD BALANCER AND LOAD BALANCING SYSTEM

(75) Inventors: Mariko Nakayama, Tokyo (JP); Atsuya Kumagai, Kawasaki (JP); Kiminori Sugauchi, Yokohama (JP); Kunihiko Toumura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 13/037,410

(22) Filed: Mar. 1, 2011

(65) Prior Publication Data
US 2011/0276982 A1    Nov. 10, 2011

(30) Foreign Application Priority Data
May 6, 2010    (JP) .................................. 2010-106087

(51) Int. Cl.
*G06F 9/46*    (2006.01)

(52) U.S. Cl.
USPC ........................................................ 718/105

(58) Field of Classification Search
None
See application file for complete search history.

(56) References Cited

U.S. PATENT DOCUMENTS 6,128,660 A * 10/2000 Grimm et al. ................. 709/227
2007/0233838 A1 * 10/2007 Takamoto et al. ............ 709/223

FOREIGN PATENT DOCUMENTS

JP    2009-87213 A    4/2009

* cited by examiner

*Primary Examiner* — Mengyao Zhe
(74) *Attorney, Agent, or Firm* — Crowell & Moring LLP

(57) ABSTRACT

In a system including a load balancer to select a virtual server to which a request is to be transferred, the load balancer includes a function to monitor resource use states of physical and virtual servers and a function to predict a packet loss occurring in a virtual switch. The request count of requests processible by each virtual server is calculated based on the resource amount available for the virtual server and a packet loss rate of the virtual switch, to thereby select a virtual server capable of processing a larger number of requests.

8 Claims, 11 Drawing Sheets

SYSTEM CONFIGURATION MANAGEMENT TABLE 18

| AP SERVER | PHYSICAL SERVER | CONNECTION DESTINATION RELAY APPARATUS | INTERFACE |
|---|---|---|---|
| VIRTUAL SERVER 31 | PHYSICAL SERVER 3 | RELAY APPARATUS A | 1/3 |
| VIRTUAL SERVER 41 | PHYSICAL SERVER 4 | RELAY APPARATUS A | 1/4 |
| VIRTUAL SERVER 51 | PHYSICAL SERVER 5 | RELAY APPARATUS A | 1/5 |

RESOURCE MANAGEMENT TABLE
(RELAY APPARATUS)

| RELAY APPARATUS | INTERFACE | PACKET RATE | BIT RATE |
|---|---|---|---|
| RELAY APPARATUS 2 | 0/1 | 300 | 20K |
| RELAY APPARATUS 2 | 0/2 | 2000 | 5M |
| | ⋮ | | |

FIG. 9

RESOURCE MANAGEMENT TABLE (CPU 34)

| TYPE | ASSIGNMENT RATE ($C_A$) | UTILIZATION ($C_U$) | SHARE SETTING |
|---|---|---|---|
| VIRTUAL OS | 5% | 5% | — |
| VIRTUAL SERVER 31 | 50% | 25% | VIRTUAL SERVER 32 |
| VIRTUAL SERVER 32 | 25% | 20% | VIRTUAL SERVER 31 |
| VIRTUAL SERVER 33 | 20% | 20% | — |
| TOTAL ($C_P$) | 100% | 70% | — |

FIG. 10

PROPERTY MANAGEMENT TABLE 20

| PACKET RATE | PACKET LOSS RATE OBSERVING SCHEME |
|---|---|
| $R < \alpha$ | $L = 0$ |
| $\alpha \leq R \leq \beta$ | $L = L_R \times C_C / C_R$ |
| $R > \beta$ | $L = 1$ |
| ⋮ | ⋮ |

FIG. 11

- 1101 REFER TO RESOURCE AND CONFIGURATION MANAGEMENT TABLES
- 1102 OBTAIN INPUT PACKET RATE OF PHYSICAL SERVER
- 1103 OBTAIN PROPERTY MANAGEMENT TABLE
- 1104 DETERMINE PACKET LOSS RATE PREDICTION SCHEME
- 1105 CALCULATE PACKET LOSS RATE

FIG. 12

| INPUT RATE (R) | CPU UTILIZATION ($C_R$) | PACKET LOSS RATE ($L_R$) |
|---|---|---|
| 1000 | 10% | 0.1% |
| 5000 | 20% | 0.5% |
| 10000 | 40% | 1.0% |
| ⋮ | ⋮ | ⋮ |

FIG. 14

REQUEST COUNT CONVERSION TABLE

| | CPU ASSIGNMENT RATE OF VIRTUAL SERVER (%) $C_A$ | | | | |
|---|---|---|---|---|---|
| | 20 | 40 | 60 | 80 | 100 |
| PACKET LOSS RATE (%) L — 0 | | | | | |
| 0.5 | | | | | |
| 1 | | | | | |
| 1.5 | | | | | |
| ... | | | | | |

REQUEST COUNT CONVERSION TABLE

| | | CPU ASSIGNMENT RATE OF VIRTUAL SERVER (%) $C_A$ | | | | |
| --- | --- | --- | --- | --- | --- | --- |
| | | 20 | 40 | 60 | 80 | 100 |
| CPU UTILIZATION OF PHYSICAL SERVER (%) $C_P$ | 20 | | | | | |
| | 40 | | | | | |
| | 60 | | | | | |
| | 80 | | | | | |
| | 100 | | | | | |

(Rc)

LOAD BALANCER AND LOAD BALANCING SYSTEM

INCORPORATION BY REFERENCE

The present application claims priority from Japanese application JP2010-106087 filed on May 6, 2010, the content of which is hereby incorporated by reference into this application.

BACKGROUND OF THE INVENTION

The present invention relates to a load balancer and a load balancing method for use with a request processing system in a virtual environment for distributing requests issued to the system to a plurality of virtual servers.

Due to advance and development in performance of hardware, attention has been drawn to a server virtualizing technique to logically divide one physical server into a plurality of virtual servers. According to this technique, resources available for virtual servers may be freely selected for allocation thereof to the virtual servers from the resources of the physical server such as a Central Processing Unit (CPU), a memory, a hard disk, and a network. Also, for a resource thus allocated, a plurality of virtual servers may designate sharing of the resource to thereby share the resource among the virtual servers. In such situation, even when one of the virtual servers completely used up the resource shared thereto, if any one of the virtual servers has a remaining portion of the associated resource shared thereto, it is possible to use the portion of the resource until the total amount of resource assigned to the virtual servers is completely used.

In a web system, a scale-out scheme is employed to improve the system processing performance. According to the scale-out scheme, a plurality of servers to execute mutually same processing are employed such that requests are distributed to the servers by use of a load balancer, to thereby improve the overall system processing performance.

Load balancing algorithms to determine one of the servers to process a request include a least connection algorithm and a least processing algorithm.

According to the least connection algorithm, the system selects one of the servers having the smallest number of connections to the load balancer, to distribute the request to the server.

According to the least processing algorithm, an agent to monitor a CPU utilization is installed in each of the servers such that the system selects one of the servers having the lowest CPU utilization, to distribute the request to the server.

JP-A-2009-087213 describes a job assigning scheme in which surplus processing capacity is calculated for each of the computers based on a performance value unique to the computer such as the Million Instructions Per Second (MIPS), a CPU utilization, and a threshold of the CPU utilization of the computer, to thereby assign a job to one of the computers having the largest surplus processing capacity.

SUMMARY OF THE INVENTION

When the load is distributed to a server in the least connection algorithm, the load balancer cannot know the current state of the server. Hence, it is likely to send requests to the server, the requests exceeding the processing capacity of the server. In this situation, an upper limit of the number of connections may be set in advance. However, in the virtual environment, the maximum number of requests which can be processed by one virtual server varies depending on, for example, the amount of CPU resource assigned to the virtual server, the CPU utilization of each of the other virtual servers to which sharing is set for the resource, and the state of the network connecting the load balancer to AP servers (to execute application software). Hence, it is essential to dispose an upper limit setting section or unit which operates in association with the maximum number of requests changing as above.

When the least processing scheme is employed to distribute load, the CPU utilization detectable by an agent installed in the virtual server is represented by "utilization of virtual server/CPU utilization assigned to virtual server". Hence, it may occur that the load is assigned to other than one of the virtual servers having the largest surplus computer resource. When the load is distributed based on the CPU utilization of the physical server, each virtual server cannot use the CPU resource exceeding the assignment rate set thereto. Hence, it may occur that the load is assigned to other than one of the virtual servers having the largest surplus CPU resource thereof.

When the technique described in JP-A-2009-087213 is employed to calculate the surplus capacity of each virtual server, the calculation result varies depending on whether or not the CPU resource sharing is taken into consideration. When the CPU resource sharing is set to a plurality of virtual server groups, it is likely that the load is not assigned to an appropriate virtual server.

The virtual environment includes a virtual switch to distribute an Ethernet frame received by a network InterFace (IF) of the physical server to a plurality of virtual servers. For the virtual switch, processing is executed by software by use of the CPU resource of the physical server and hence is lower in transfer performance than a physical switch which executes processing by hardware. That is, even if a one-gigabit network interface is disposed in the physical server, a packet loss takes place in a communication at a packet rate equal to or less than one gigabit per second. When the Transmission Control Protocol (TCP) is used for the communication of a session, signal retransmission is conducted with the session kept sustained. This resultantly elongates the request processing time. Hence, even if the CPU resource available for the virtual server is kept unchanged, the number of processible requests is reduced in this situation.

When packets are inputted to the physical server at an input rate exceeding the performance limit of the virtual switch, almost all packets are discarded by the virtual switch and hence no request arrives at any virtual server. In this situation, since each virtual server processes no request, the CPU utilization thereof is lowered. When the request is distributed based on the CPU resource, any virtual server at which no request arrives seems to have a surplus CPU resource. Hence, many requests are distributed to the virtual server. However, the requests are actually discarded by the virtual switch and do not arrive at the virtual server. Therefore, although the virtual server has a surplus CPU resource in this state, it cannot actually process any request distributed thereto from an external device.

It is therefore an object of the present invention to provide a load balancer and a load balancing method in which it is possible to transfer a request to an appropriate virtual server based on actual surplus processing performance or capacity of each of the virtual servers calculated in consideration of reduction in the processing capacity due to the packet loss in the virtual switch connecting each virtual server to an external device. It is hence possible to increase the number of requests to be processed in the overall system.

Another object of the present invention is to provide a load balancer and a load balancing method in which in association with setting of shares of CPU resource assignment among a plurality of virtual servers, the surplus processing capacity of each virtual server is appropriately calculated, to thereby select one of the virtual servers as an appropriate request transfer destination.

To achieve the objects, the load balancer includes a unit to monitor a CPU resource assignment rate, a CPU utilization, and a share setting of a virtual server; a CPU utilization of a physical server, and a packet loss rate of a virtual switch, to determine a virtual server to which a request is to be transferred, according to the CPU resource and the packet loss rate of the virtual switch.

The load balancer can distribute, in consideration of influence from the packet loss taking place in the virtual switch, a request to a virtual server capable of processing a larger number of requests.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram showing a layout of a resource management table for a physical server in the first embodiment;

FIG. 10 is a diagram showing a layout of a property management table for a virtual switch in the first embodiment;

FIG. 11 is a flowchart showing packet loss rate estimating process in the first embodiment;

FIG. 12 is a diagram showing a layout of a packet loss measurement table for a virtual switch in the first embodiment;

FIG. 14 is a diagram showing a layout of a request count conversion table in a second embodiment;

FIG. 16 is a diagram showing a layout of a request count conversion table in a third embodiment.

DESCRIPTION OF THE EMBODIMENTS

1. First Embodiment

Figure 1:
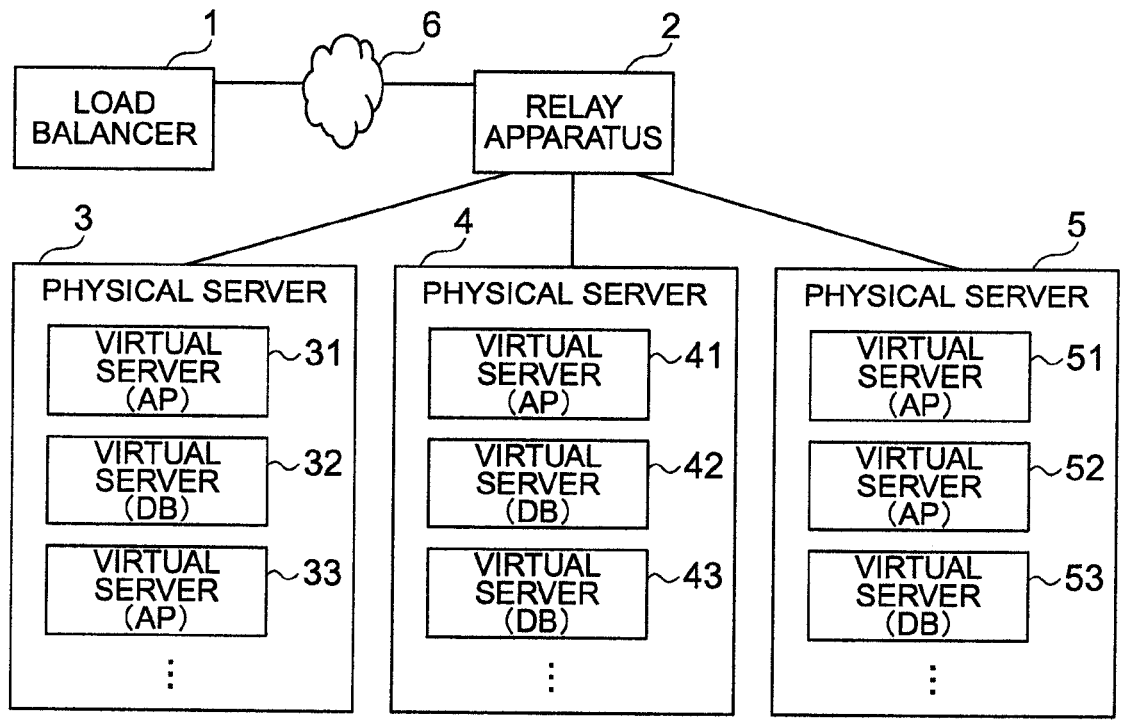
FIG. 1 is a block diagram showing a request processing system in a first embodiment.

FIG. 1 shows a configuration of a request processing system in a first embodiment according to the present invention. The request processing system of the first embodiment includes a load balancer 1, a relay apparatus 2, physical servers 3 to 5, virtual servers 31 to 33 of the physical server 3, virtual servers 41 to 43 of the physical server 4, virtual servers 51 to 53 of the physical server 5, and a network 6 to connect the load balancer 1 to the relay apparatus 2.

The load balancer 1 is an apparatus to select an appropriate virtual server from the virtual servers of the web system and to transfer a request to the virtual server. Among the relay apparatuses of the network 6 to connect the load balancer 1 to the physical servers, the relay apparatus 2 directly connects to the physical servers 3 to 5. Due to the direct connections, it is possible to assume that Internet Protocol (IP) packets and frames sent from the relay apparatus 2 to the physical servers 3 to 5 are received entirely by the physical servers 3 to 5. In a connection mode of such situation, the relay apparatus 2 may be connected to the physical servers 3 to 5 via any other relay apparatuses such as a switch and a router.

In the physical server 3, virtual servers 31 to 33 are formed. Each virtual server uses logically subdivided resources such as the CPU, the memory, the hard disk, and the network of the physical server. Similarly, virtual servers 41 to 43 are formed in the physical server 4 and virtual servers 51 to 53 are formed in the physical server 5.

Figure 2:
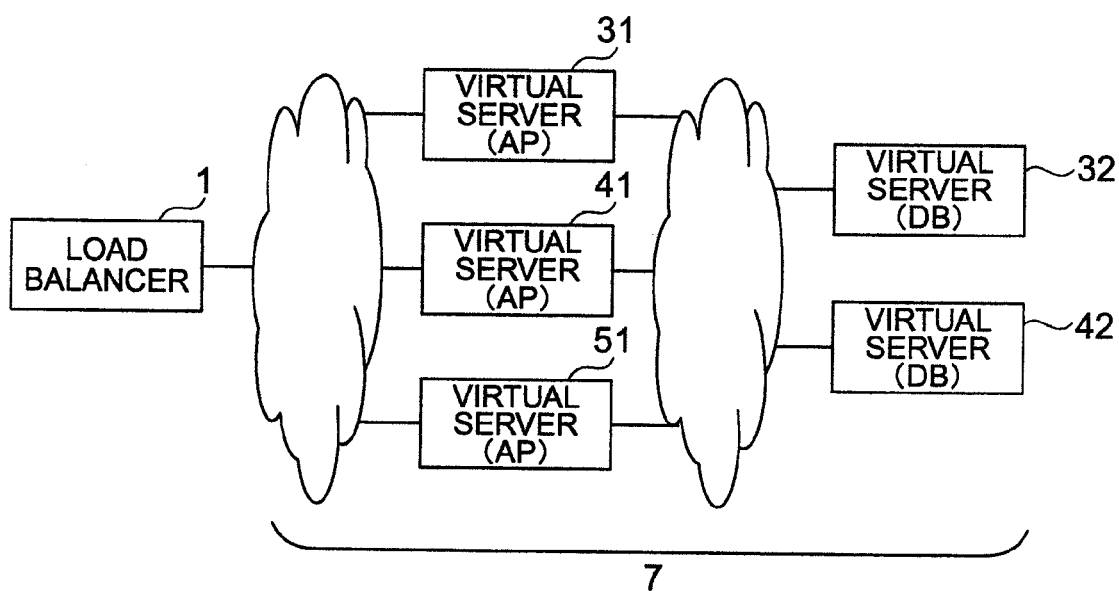
FIG. 2 is a diagram showing a logical configuration of the request processing system in the first embodiment.

FIG. 2 shows a logical system configuration of the virtual server. The load balancer 1 and virtual servers 31, 32, 41, 42, and 51 form a web system 7. The virtual servers 31, 41, and 51 execute application software in response to requests from client terminals and then transfer thereto execution results in the form of sentences or texts in, for example, Hyper Text Markup Language (HTML). Servers to execute application software will be referred to as AP servers hereinbelow. In the web system configuration, a web server which responds to a request from a client terminal to transmit thereto only static contents such as HTML texts and images is discriminated from the AP server depending on cases. However, the load balancer conducts the same transfer processing for the web server and the AP server to achieve the load distributing or balancing operation through similar processing for the web and AP servers. Hence, the web and AP servers will be generally referred to as AP servers hereinbelow.

The virtual servers 32 and 42 are virtual servers to operate and to control a database in the system. Servers to operate and to control a database will be referred to as DB servers hereinbelow.

The load balancer 1 receives a request issued to each of a plurality of web systems, selects an appropriate AP server, and transfers the request thereto. The AP server processes the request and issues a request to a DB server if necessary, to thereby operate the database. The virtual servers 33, 43, 52, and 53 are used to configure a web system other than the web system 7, and each virtual server executes processing therein. Hence, the resources such as the CPU and the network to be used by each virtual server vary during the processing.

Figure 3:
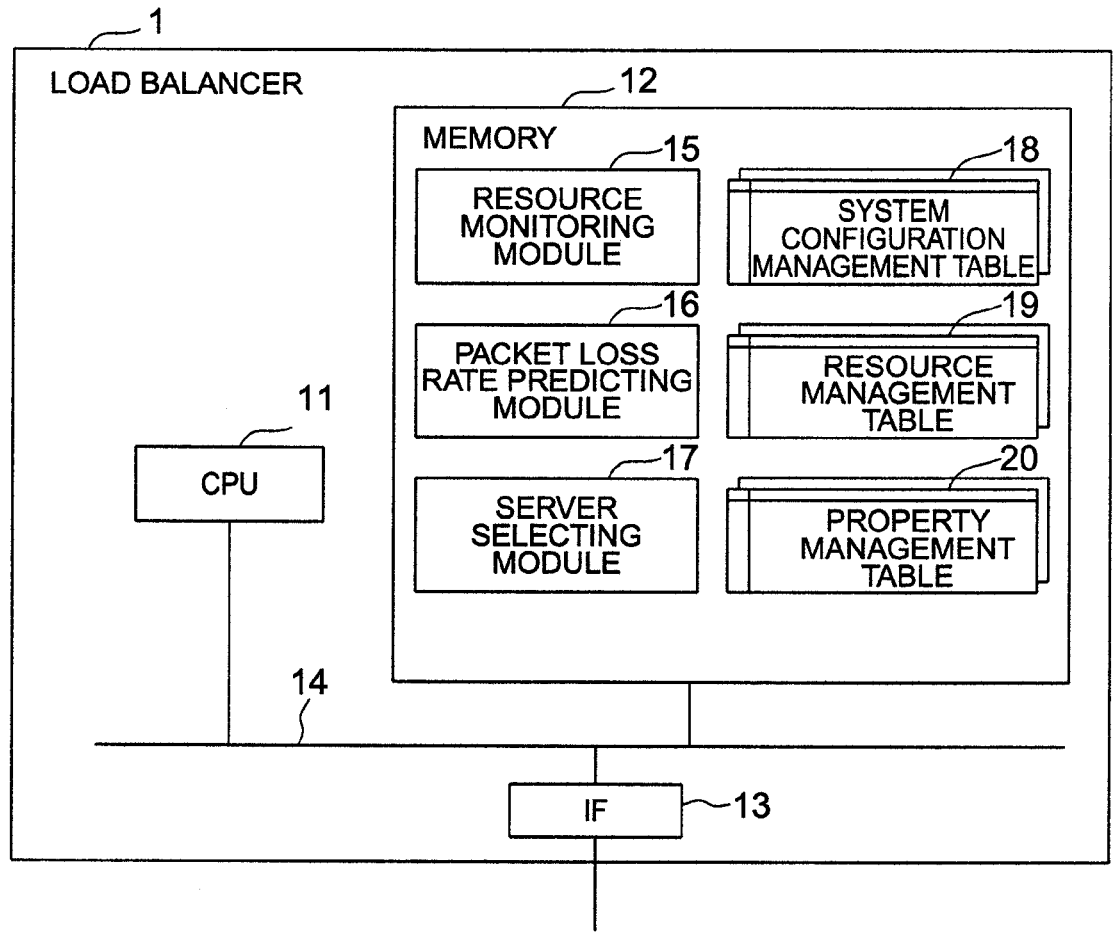
FIG. 3 is a block diagram showing a configuration of a load balancer in the first embodiment.

FIG. 3 shows a configuration of the load balancer 1 in the first embodiment of the present invention in a block diagram.

The load balancer 1 includes a CPU 11, a memory 12, and an interface 13.

The CPU 11 executes an Operating System (OS) and various application programs. The memory 12 stores therein various application program modules to be executed by the CPU 11 and various tables. The CPU 11, the memory 12, and the interface 13 are linked via a bus 14 to each other.

In the memory 12, a resource monitoring module 15 obtains a CPU utilization of each of the physical servers 3 to 5. For the CPU of each physical server, the resource monitoring module 15 obtains a CPU utilization (distributive utilization) of each of the virtual servers 31 to 33, 41 to 43, and 51 to 53, to control information of the CPU utilizations. Also, for the CPU of each physical server, the resource monitoring module 15 keeps a CPU assignment rate of each virtual server and information of resource sharing among the virtual servers. Further, the resource monitoring module 15 obtains and monitors an input packet rate and an input bit rate of an interface disposed in the relay apparatus 2, namely, an input packet rate and an input bit rate of each of the physical servers 3 to 5.

In the memory 12, a packet loss rate predicting module 16 monitors a packet loss taking place between the load balancer 1 and each AP server, to predict a packet loss rate.

Based on resources available for each virtual server and the predicted value of the packet loss, a server selecting module 17 determines a virtual server to which a request is to be transferred.

In the memory 12, a system configuration management table 18 records and controls the system configuration of a web system as a control target of the load balancer 1. A resource management table 19 is disposed for each of the computer resources such as a relay apparatus and a physical server CPU, to record and to control assignment and use states of the resources. A property management table 20 is disposed for each virtual switch arranged for each physical server. These constituent components will be described later in detail in conjunction with associated drawings.

Figure 4:
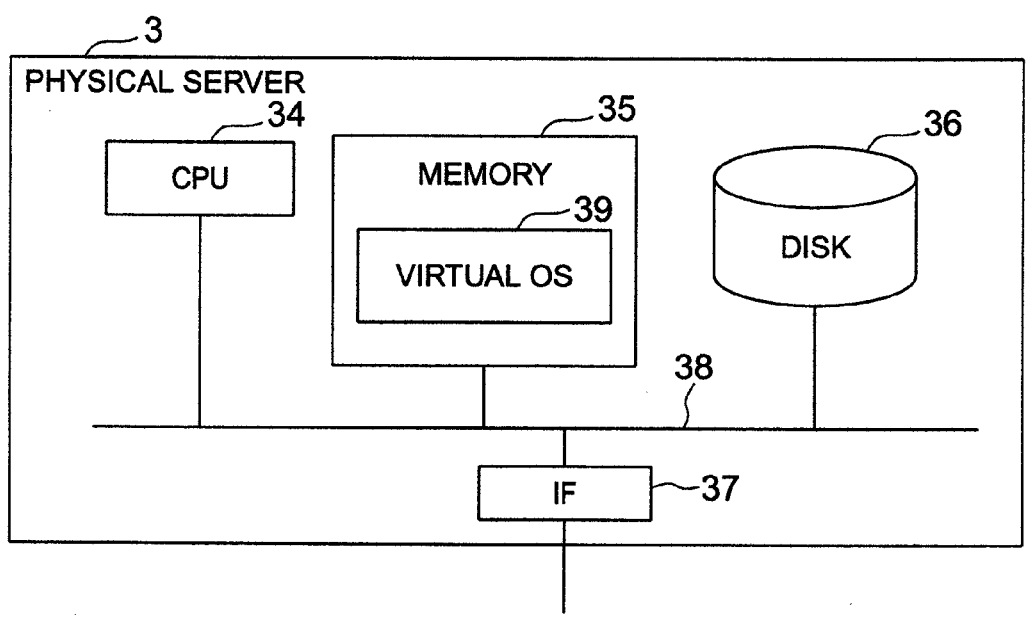
FIG. 4 is a block diagram showing a physical configuration of a physical server in the first embodiment.

FIG. 4 shows a configuration of the physical server 3 in a block diagram. The physical server 3 includes a CPU 34, a memory 35, a disk 36, and an interface 37.

Figures 5, 6:
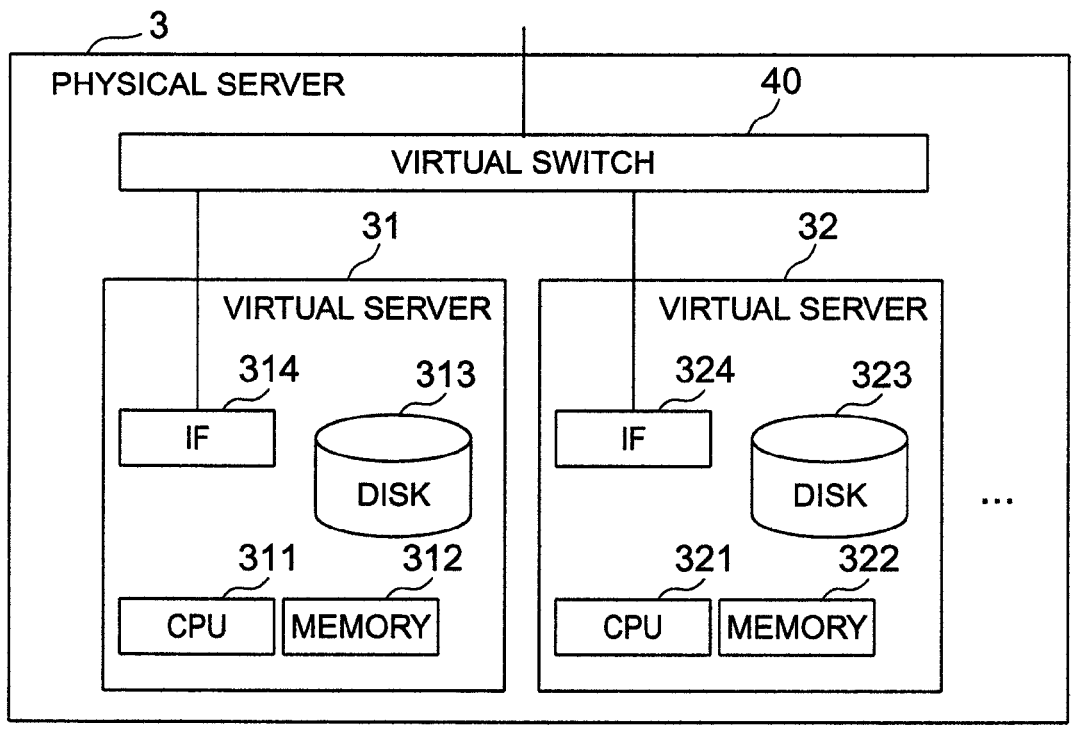
FIG. 5 is a block diagram showing a logical configuration of the physical server in the first embodiment.
FIG. 6 is a diagram showing a layout of a system configuration management table in the first embodiment.

The CPU 34 executes processing of a virtual Operating System (OS) 39 arranged in the memory 35. The virtual OS 39 logically subdivides physical resources of the physical server 3 such as the CPU 34, the memory 35, the disk 36, and the interface 37 to form a plurality of virtual servers. The CPU 34, the memory 35, the disk 36, and the interface 37 are coupled via a bus 38 with each other. FIG. 5 shows a logical configuration of the physical server 3 in a block diagram. The physical server 3 is logically subdivided by the virtual OS 39 into virtual servers 31 to 33. The virtual server 31 logically includes a virtual memory 312, a virtual disk 313, and a virtual network interface 314. When viewed from the virtual server, each resource virtually included in the virtual server seems to be a physical resource. Hence, these resources will be simply referred to as a CPU, a memory, a disk, and a network interface hereinbelow.

The virtual servers 32 and 33 are also configured in almost the same way as for the virtual server 31. In the physical server 3, the virtual servers 31 to 33 are linked via a virtual switch 40 to each other. The virtual servers 31 to 33 communicate via the virtual switch 40 with each other. Also, virtual servers 31 to 33 are connected via the virtual switch 40 to the relay apparatus 2 outside the physical server 3 and to the virtual servers 41 to 43 and 51 to 53 respectively in the physical servers 4 and 5.

The physical servers 4 and 5 are physically and logically configured in almost the same way as for the physical server 3.

<Load Balancer>

The load balancer 1 receives a request issued to a web system the configuration of which is controlled by the load balancer 1, and transfers the request to an appropriate AP server.

The load balancer 1 configures the system configuration management table 18. This table controls, for each web system, AP servers to which the load balancer 1 transfers requests. FIG. 6 shows a configuration of the system configuration management table 18. Each entry of this table includes information pieces of an AP server as a transfer destination of a request, a physical server to which the AP server belongs, a relay apparatus to which the interface of the physical server connects, and data to identify an interface of the relay apparatus. According to the example of FIG. 6, AP servers of the web system 7 are the virtual servers 31, 41, and 51; physical servers to which the respective virtual server belong are the physical servers 3 to 5, and interfaces to which the respective physical servers are to be connected are interfaces ⅓, ¼, and ⅕ of the relay apparatus A.

Next, description will be given of the resource monitoring module 15 of the load balancer 1. The load balancer 1 activates the resource monitoring module 15 at a regular interval, at reception of a request, or at change of a setting item, to monitor states of resources of the virtual servers, physical servers, and relay apparatuses.

Figures 7, 8:
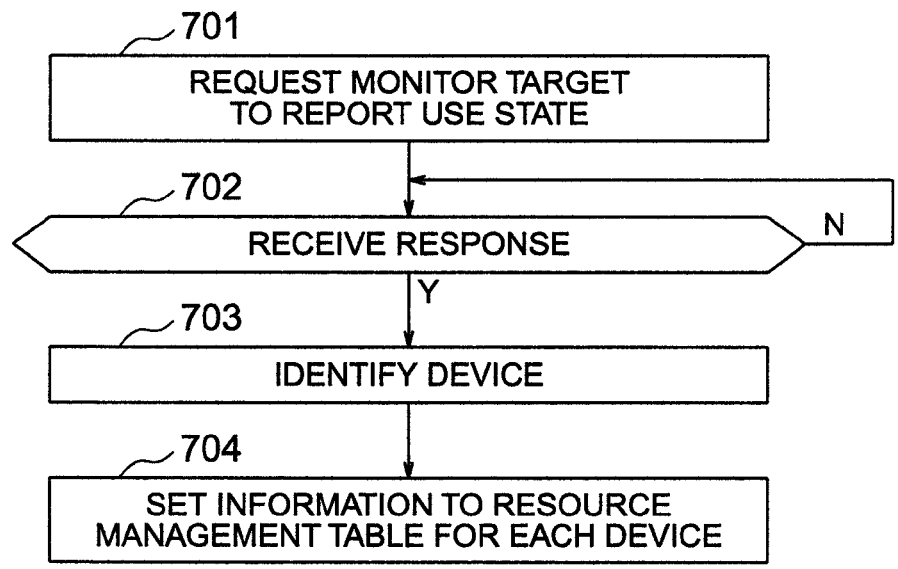
FIG. 7 is a flowchart showing resource monitoring process in the first embodiment.
FIG. 8 is a diagram showing a layout of a resource management table for a relay apparatus in the first embodiment.

FIG. 7 shows a processing flow of the resource monitoring module 15. In step 701, the load balancer 1 issues a request for a resource state report to monitor target devices such as a physical server and a relay apparatus. If no response is received from the monitor target unit (no in step 702), the load balancer 1 enters a wait state to wait for a response. At reception of a response therefrom (yes in step 702), the load balancer 1 identifies the monitor target device from which the response is received (step 703) and registers information obtained from the response to the resource management table 19 for the monitor target device (step 704).

FIG. 8 shows a configuration of the resource management table 19 for the relay apparatus. The resource monitoring module 15 obtains a packet rate and a bit rate from each interface to the physical server and then sets the packet and bit rates to the resource management table of the relay apparatus. The packet rate is the number of Ethernet frames or IP packets outputted per unitary period of time and the bit rate is an amount of information contained in the Ethernet frames or IP packets outputted per unitary period of time FIG. 9 shows a configuration of the resource management table for the physical server. The resource monitoring module 15 obtains states of the CPU resources of the physical servers 3 to 5 and then sets the states to the resource management table of the associated physical server. The information obtained from the physical server includes an upper-limit value (assignment rate) of the CPU resource assigned to each virtual OS and each virtual server, utilizations of the virtual OS and the virtual server, and presence or absence of sharing between virtual servers. The sharing is employed to share a CPU resource between virtual servers. Even in a situation in which one of the virtual servers between which sharing is set uses up the CPU resource according to the assigned rate, if the associated virtual server has a surplus CPU resource, it is possible to use the CPU resource according to an assignment rate obtained by adding the assignment rates of these virtual servers to each other.

In the example shown in FIG. 9, the sharing is set between the virtual servers 31 and 32. The virtual servers 31 and 32 may use the CPU resource according to assignment rates thereof, namely, at most 50% and 25% of the overall CPU resource, respectively. In a situation in which the virtual server 31 uses 25% of the CPU resource and has a surplus CPU resource, the virtual server 32 can use up to 50% of the CPU resource. In this way, in the virtual environment, when a CPU assignment rate is set to a virtual server and the sharing is set between the virtual server and a second virtual server, the maximum value of the assignment rate of the CPU resource available for the virtual server varies depending on the utilization of the second virtual server.

Next, description will be given of processing by the packet loss rate predicting module 16 of the load balancer 1. This module is a program module to predict a packet loss rate of each virtual switch 40 of the physical servers 3 to 5 based on measured data such as a packet rate.

The virtual switch 40 is implemented through software processing by the virtual OS 39. When the input packet rate of packets inputted to each of the physical servers exceeds a predetermined threshold, the switching operation speed is not sufficient and a packet loss occurs in the virtual switch 40. Once a packet loss occurs, the event of such packet loss oftener occurs thereafter as the input packet rate and the CPU utilization of each physical server become higher. Further, if packets are inputted to the physical servers at a packet rate exceeding the performance limit of the virtual switch 40, many packets are discarded by the virtual switch 40 and no packet or frame is inputted to the virtual servers. In this situation, even if the CPU utilization of the physical server is low, no request is transferred to the virtual servers. Hence, the virtual servers cannot process any request.

To manage the performance property of the virtual switch 40, the load balancer 1 includes a property management table 20 for each virtual switch 40. FIG. 10 shows a configuration of the property management table 20. Each entry of this table includes a packet rate for which the property of the packet loss rate of the virtual switch changes and a packet loss rate prediction scheme corresponding to the change in the performance property.

Assume that the input packet rate at which a packet loss starts to occur is $\alpha$, the input packet rate as the performance limit of the virtual switch is $\beta$, the input packet rate of the physical server is R, and the packet loss rate of the virtual switch is L. If the input packet rate R of the physical server is less than the threshold $\alpha$ of the packet loss occurrence, no packet loss takes place and the packet loss rate L is represented as follows.

$$L=0 (R<\alpha) \quad (1)$$

If the input packet rate R of the physical server is equal to or more than the threshold a of the packet loss occurrence, the packet loss rate L is proportional to the input packet rate and the CPU utilization of the physical server and is hence represented as follows.

$$L=L_R \times C_C/C_R (\alpha \leq R \leq \beta) \quad (2)$$

wherein, $L_R$ is a packet loss rate measured for the input packet rate R, $C_R$ is a CPU utilization of the physical server measured for the input packet rate R, and $C_C$ is the current CPU utilization of the physical server obtained from the resource management table.

$L_R$ and $C_R$ are beforehand measured values of performance properties as references to predict the packet loss rate of the virtual switch. That is, while the load conditions of, for example, the numbers respectively of virtual servers and applications operating on the physical server are kept fixed, the correspondence of the CPU utilization $C_R$ of the physical server to the input packet rate R of the virtual switch and the correspondence of the packet loss rate $L_R$ of the virtual switch thereto are measured, to thereby obtain $L_R$ and $C_R$. However, in the present embodiment, the values of $L_R$ and $C_R$ are measured for a plurality of representative values of the input packet rate R in a range of $\alpha \leq R \leq \beta$ and are beforehand stored in a packet loss measurement table shown in FIG. 12. The actually observed values do not necessarily match the representative values. In such situation, an interpolation is employed using the measured values corresponding to at least two representative packet rate values, to thereby obtain the values of $L_R$ and $C_R$. The packet loss rate is predicted through the interpolation of expression (2) by use of the values of $L_R$ and $C_R$ thus obtained and the current CPU rate $C_C$ obtained from the resource management table. Further, if the input packet rate R of the physical server is more than the performance limit $\beta$ of the virtual switch, almost all packets are discarded by the virtual switch. Hence, the packet loss rate of the virtual switch is expressed as below.

$$L=1 (R>\beta) \quad (3)$$

FIG. 11 shows a processing flow of the packet loss rate predicting module 16. When this module starts its operation, the load balancer 1 refers to the configuration management table 18 in step 1101 to determine a relay apparatus and an interface to connect to each physical server. The load balancer 1 further refers to the resource management table 1 to determine an input packet rate for the interface. In step 1102, based on the information determined in step 1101, the load balancer 1 determines an input packet rate for each physical server. The load balancer 1 then obtains a property management table 20 of the virtual switch (step 1103) and then determines a packet loss rate prediction scheme associated with the input packet rate for the physical server (step 1104). That is, for each physical server, the load balancer 1 refers to the property management table associated therewith by using as a key the value of the input packet rate of the physical server obtained in step 1102, to thereby determine the packet loss rate prediction scheme for the virtual switch formed in the physical server. In step 1105, based on the packet loss rate prediction scheme determined in step 1104, the load balancer 1 predicts a packet loss rate possibly appearing in the virtual switch. Particularly, if the input packet rate R of the physical server in the virtual switch is in the range of $\alpha \leq R \leq \beta$ and the prediction scheme represented by expression (2) is obtained, the load balancer 1 refers to the packet loss measurement table according to the value of the input packet rate R to obtain the measured values $L_R$ and $C_R$. Or, the load balancer 1 conducts an interpolation by use of a plurality of measured values $L_R$ and $C_R$ obtained from the packet loss measurement table, to calculate the measured values $L_R$ and $C_R$ corresponding to the value of the input packet rate R. The load balancer 1 predicts the packet loss rate L by assigning to expression (2) the values $L_R$ and $C_R$ and the CPU utilization $C_C$ obtained by referring to the resource management table.

Next, description will be given of the server selecting module 17 of the load balancer 1. This module is a program module to select, based on states of resources such as physical servers and virtual servers, a virtual server to which a request is to be transferred.

Figure 13:
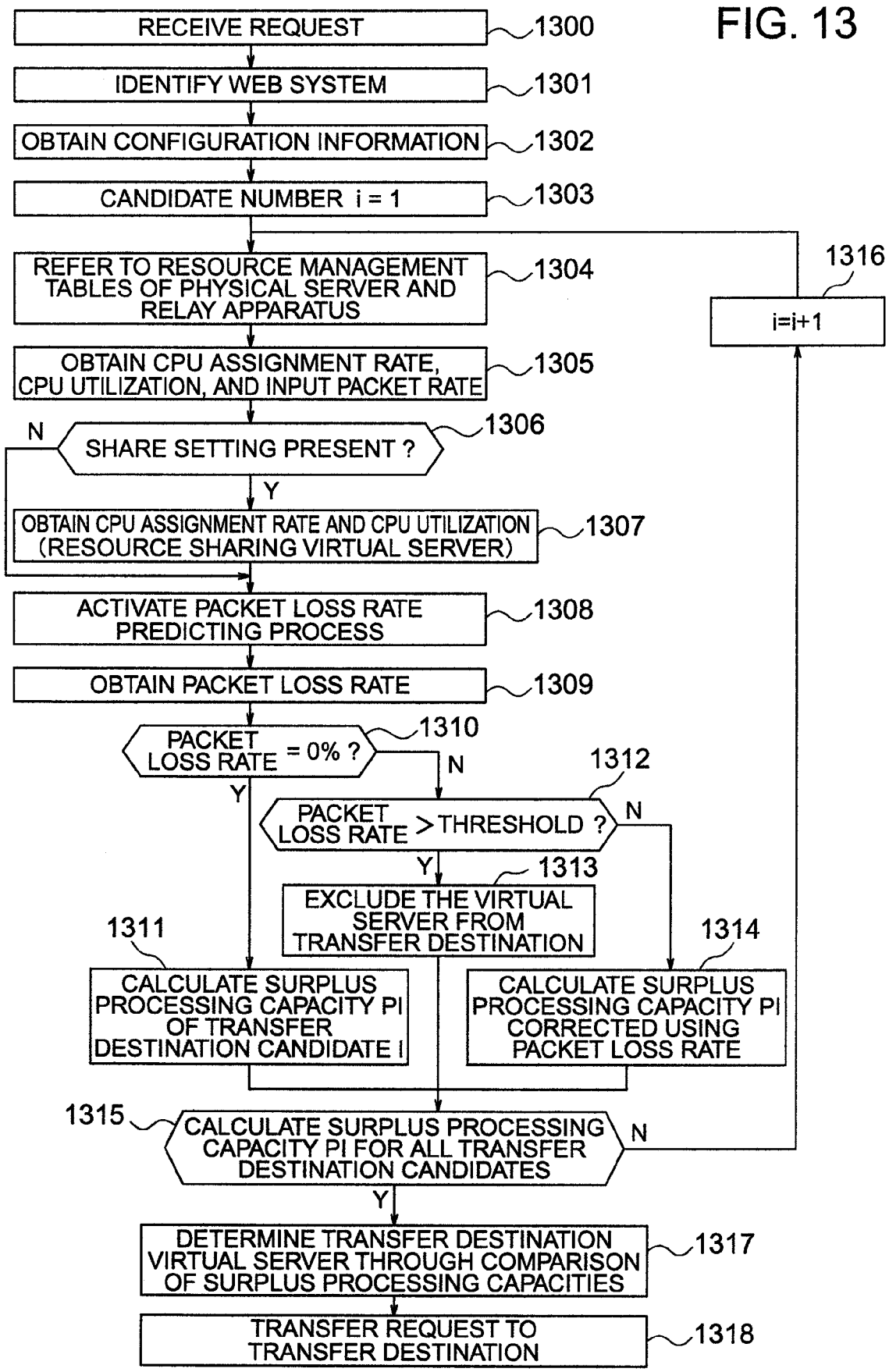
FIG. 13 is a flowchart showing server selecting process in the first embodiment.

FIG. 13 shows a processing flow of the server selecting module 17.

The load balancer 1 receives a request including a request message from a client terminal (step 1300). In step 1301, based on information or an IP address included in the request message, the load balancer 1 determines a web system as a transfer destination and then refers to the configuration management table 13 of the web system to obtain information of a virtual server as a candidate of the request transfer destination and information of a physical server to which the virtual server belongs. Assume, for example, that the load balancer 1 has identified the web system 7. From the configuration management table 18, the load balancer 1 obtains information pieces of the virtual servers 31, 41, and 51 as AP servers in the web system 7, the physical servers 3 to 5 to which these virtual servers belong, and a relay apparatus and interfaces to which the physical servers 3 to 5 connect (step 1302).

In step 1303 and subsequent steps, the load balancer 1 sequentially calculates surplus processing capacity of each virtual server as a request transfer destination beginning at "candidate number i=1". First, the load balancer 1 obtains a resource management table of a physical server to which a virtual server as a calculation target belongs and then a resource management table of the relay apparatus (step 1304). In step 1305, from the resource management table of the physical server, the load balancer 1 obtains the CPU assignment rate $C_A$ and the CPU utilization $C_U$ of the virtual server as the calculation target and the total CPU utilization $C_P$. The total CPU utilization $C_P$ is the sum of CPU utilizations assigned to the virtual servers and the virtual OS in the physical server, namely, the CPU utilization of the physical server to which the virtual server as the calculation target belongs. Also, the load balancer 1 obtains information of an input packet rate of the physical server from the resource management table of the relay apparatus.

Next, for the virtual server as the calculation target, if the sharing is set to share a resource with a second virtual server (yes in step 1306), the load balancer 1 obtains the CPU assignment rate $C_A$ and the CPU utilization $C_U$ of each of these virtual servers (step 1307).

Next, the load balancer 1 activates the packet loss rate predicting module 16 (step 1308) to predict a packet loss possibly taking place in the virtual switch to which the virtual server as the calculation target connects (step 1309).

If the predicted value of the packet loss rate is zero percent (yes in step 1310), control goes to step 1311 to set the value of the CPU resource available for the virtual server directly to the surplus processing capacity Pi. If the predicted value of the packet loss rate is equal to or more than a threshold (yes in step 1312), the virtual server is excluded from the virtual servers for the selection of the transfer destination (step 1313). This prevents the load balancer 1 from selecting a virtual server which has a low CPU utilization and which cannot process any request because the request packets are discarded by the virtual switch. If the packet loss rate is less than the threshold (no in step 1312), control goes to step 1314 in which the load balancer 1 corrects the CPU resource value available for the virtual server according to the packet loss rate, to obtain the value of the surplus processing capacity Pi.

Description will now be given of the scheme of calculating the surplus processing capacity Pi of the virtual server in steps 1311 and 1314 by referring to an example.

The amount of the resource $C_i$ available for the virtual server i is the difference between the CPU assignment rate $C_{Ai}$ of the virtual server and the actual CPU utilization $C_{Ui}$ of the virtual server and is hence expressed as below.

$$C_i = C_{Ai} - C_{Ui} \qquad (4)$$

If the sharing (of the resource) is set between the virtual servers i and j, the amount of the CPU resource $C_i$ available for the virtual server i is expressed as follows by assuming that the CPU assignment rate of the virtual server j is $C_{Aj}$ and the actual CPU utilization thereof is $C_{Uj}$.

$$C_i = C_{Ai} + C_{Aj} - (C_{Ui} + C_{Uj}) \qquad (5)$$

Assuming as shown in FIG. 9 that the CPU assignment rate is 50% and the CPU utilization is 25 for the virtual server 31, $C_{31} = 0.5 - 0.25 = 0.25$ (25%). The CPU resource available for the virtual server 31 as a single unit is 25%. Further, the sharing is designated between the virtual servers 31 and 32. Hence, in consideration of the sharing, the CPU resource available for the virtual server 31 is $C_{31} = 0.5 + 0.25 - (0.25 + 0.2) = 0.3$ (30%). In step 1311, the value of the available CPU resource amount $C_i$ derived from expression (4) or (5) is assumed as the current surplus processing capacity $P_i$ of the virtual server.

If a packet loss takes place in the virtual switch, the period of time to transfer a request from the load balancer 1 to the virtual server is elongated due to the packet loss. Hence, even if the CPU resource amount available for the virtual server is the same or is kept unchanged, the number of requests processible by the virtual server and the request processing time therein change. In step 1314, a reciprocal (packet survival rate) of the packet loss rate is multiplied by the amount of the resource $C_i$ available for the virtual server to obtain the surplus processing capacity $P_i$ of the virtual server. That is, if the source sharing is not designated between the virtual server i and a second virtual server, the surplus processing capacity $P_i$ of the virtual server is calculated as below by assuming that the packet loss rate of the virtual switch is L.

$$P_i = C_i \times (1-L) = (C_{Ai} - C_{Ui})(1-L) \qquad (6)$$

wherein, $C_i$ is the resource amount further available for the virtual server i, $C_{Ai}$ is the CPU assignment rate for the virtual server, and $C_{Ui}$ is the CPU utilization of the virtual server. If the sharing is designated between the virtual servers i and j to share a resource, the surplus processing capacity $P_i$ of the virtual server is calculated as follows.

$$P_i = C_i \times (1-L) = \{C_{Ai} + C_{Aj} - (C_{Ui} + C_{Uj})\}(1-L) \qquad (7)$$

For example, if the assignment rate and the utilization of the CPU resource for the virtual server 31 are as shown in FIG. 9, the CPU resource amount $C_{31}$ processible by the virtual server 31 as a single unit is 25%. If the share setting is taken into consideration, the CPU resource amount $C_{31}$ is 30%. In the presence of a packet loss of one percent in the virtual switch, the surplus processing capacity $P_{31}$ is as follows.

$$P_{31} = 0.25(1-0.01) = 0.248(24.8\%)$$

If the surplus processing capacity is calculated in step 1311 or 1314 or if the virtual server is excluded from the transfer destination selection, the candidate number i is updated in step 1316 and control returns to step 1304 to calculate the surplus processing capacity for the next virtual server. This operation is repeatedly conducted until the completion of the calculation of the surplus processing capacity is confirmed for all virtual servers as the transfer destination candidates in step 1315. In step 1317, the values of the surplus processing capacity thus calculated for the virtual servers are compared with each other to determine, as the request transfer destination, one of the virtual servers having the largest value of the surplus processing capacity.

In the request processing system to distribute a request by determining a transfer destination thereof as above, even if the CPU resource sharing is set between a virtual server as the transfer destination candidate and a second virtual server to share the CPU resource, the request can be transferred to one of the virtual servers having the largest available CPU resource. Also, since the transfer destination is selected based on the actual surplus processing capacity of the virtual server calculated in consideration of the reduction in processing capacity due to the packet loss taking place in the network between the load balancer and the AP servers, it is possible to transfer the request to the most appropriate virtual server.

2. Second Embodiment

In the first embodiment, to obtain an index in association with the reduction in processing capacity due to the packet loss for each virtual server as the candidate of the request transfer destination, the value of the available CPU resource amount obtained based on the difference between the CPU assignment rate and the actual CPU utilization is multiplied by a reciprocal of the packet loss rate. In the second embodiment, for each virtual server as the candidate of the request transfer destination, data items of the request processing count corresponding to a combination of a plurality of values respectively of the CPU assignment rate and the packet loss rate are beforehand stored in a table such that an index of each virtual server is obtained from the table. This also leads to request transfer destination selection substantially equal to that of the first embodiment. The request processing system of the second embodiment is similar in the physical configuration and the main logical configuration to that of the first embodiment.

FIG. 14 shows a layout of the request count conversion table 21 beforehand created for each AP server (a virtual server as a potential candidate of the request transfer destination) according to the second embodiment. In this table, the CPU assignment rate $C_A$ for each virtual server is horizontally indicated, and the packet loss rate L in the virtual switch is vertically represented. In a frame or field at an intersection between one column (for $C_A$) and one row (for L), there is stored data of the request processing count $R_C$ of a virtual server corresponding to the values of $C_A$ and L. The request processing count $R_C$ may be obtained through measurement or simulation.

Figure 15:
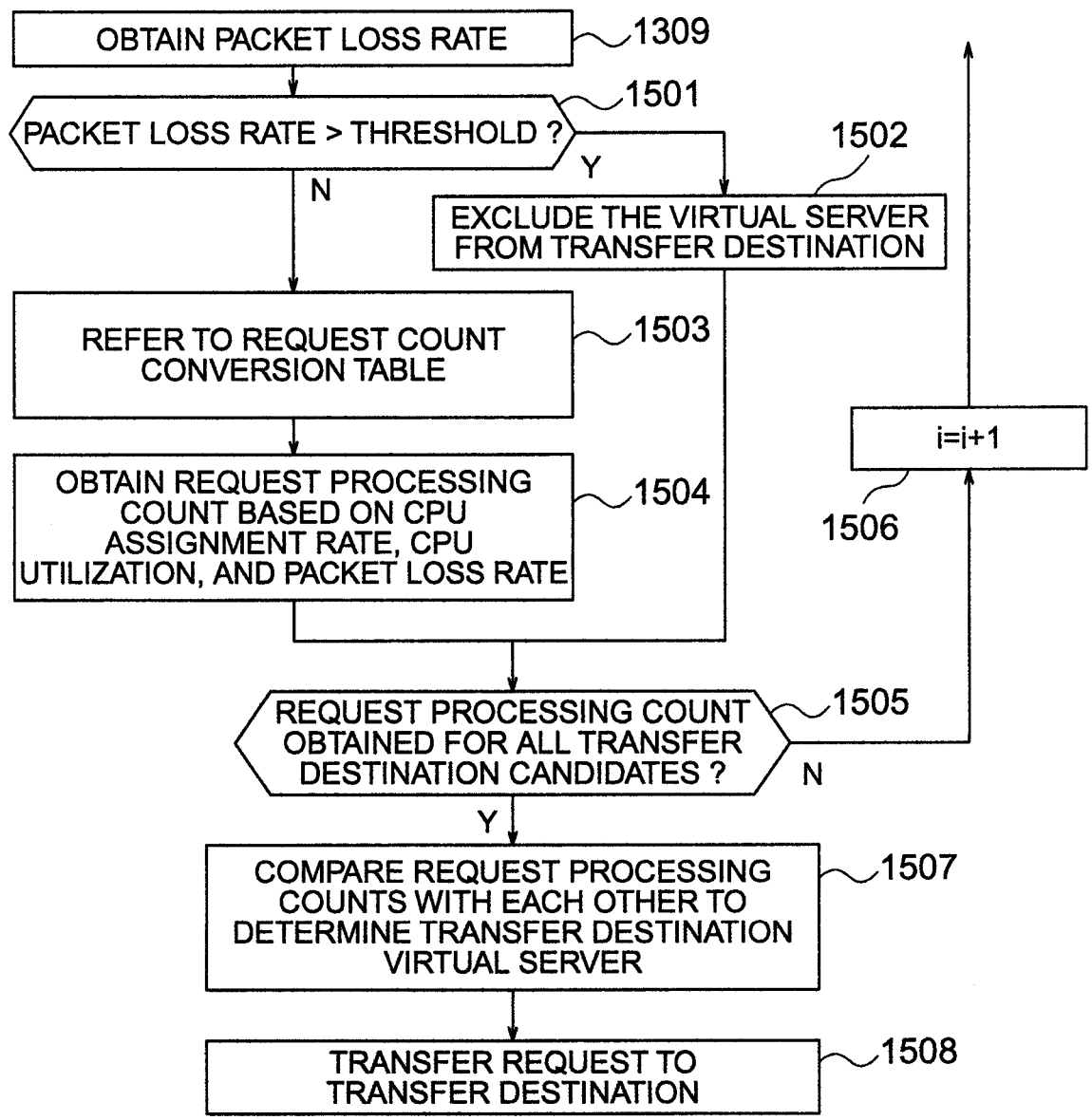
FIG. 15 is a flowchart showing server selecting process in the second embodiment.

The request count conversion table 21 is referred to in server selection processing of the server selecting module 17. According to the second embodiment, in the procedure to calculate an index for each virtual server as the transfer destination candidate, the server selection processing up to the processing (step 1309) to obtain the packet loss rate in a virtual switch is substantially equal to that of the first embodiment shown in FIG. 13. FIG. 15 shows a processing flow after step 1309.

If the packet loss rate occurring in the virtual switch exceeds a threshold (yes in step 1501), any virtual server connected to the virtual switch in which the packet loss rate exceeds the threshold is excluded from the candidates of the request transfer destination (step 1502). If the packet loss rate is equal to or less than the threshold (no in step 1501), the program refers to the request count conversion table 21 associated with the virtual server as the calculation target (step 1503). In step 1504, based on the CPU assignment rate $C_A$ of the virtual server obtained in step 1305 of FIG. 13 and the packet loss rate L of the virtual switch obtained in step 1309, the program obtains the number of requests further processible by the virtual server. Specifically, the program refers to the request count conversion table 21 to obtain the processible request count $R_C$ from a field at an intersection between the associated CPU assignment rate $C_A$ and the associated packet loss rate L. The number of requests controlled by the request count conversion table 21 is the number of processing requests corresponding to the CPU assignment of the virtual server. Hence, to calculate the number of requests $R_N$ which can be further processed by the virtual server in operation, it is required to subtract the number of requests (under processing) being processed by the virtual server. By using the number of established connections $R_{PN}$ established between the load balancer and the virtual server as the calculation target, the number of requests ($R_N$) which can be further processed by the virtual server is calculated as below.

$$R_N = R_C - R_{PN} \tag{8}$$

Ordinarily, the load balancer controls the number of established connections $R_{PN}$ established between the load balancer and an AP server. If the number of established connections $R_{PN}$ cannot be obtained, it is also possible to use, in place of $R_{PN}$, the number of requests which under processing read from the request count conversion table 21, to thereby conduct the subtraction of expression (8). That is, in the request count conversion table 21, a column is determined based on the CPU utilization $C_U$ of the virtual server in place of the CPU assignment rate $C_A$ thereof and a row is determined by the packet loss rate L in the virtual switch. The number of requests being processed by the virtual server can be obtained by referring to a field at an intersection of the column and the row of the request count conversion table 21, to thereby execute the subtraction of expression (8).

After the number of requests which can be further processed by the virtual server is calculated in step 1504, the transfer destination candidate number i is updated in step 1506. Control then returns to step 1305 to calculate the number of requests processible by the next virtual server as the transfer destination candidate. The operation is repeatedly carried out until it is determined in step 1505 that the number of requests processible by the virtual server is calculated for all transfer destination candidates. In step 1507, the numbers of requests ($R_N$) processible by the respective virtual servers as the transfer destination candidates are compared with each other such that one of the virtual servers having the largest value of $R_N$ is determined as the request transfer destination. In step 1508, the request is transferred to the virtual server.

As above, by use of the request count conversion table 21, it is possible that the load balancer 1 compares the numbers of requests which can be further processed by the respective virtual servers with each other, to thereby transfer the request to the virtual server which can further process a larger number of requests. In the request count conversion table 21, the measured value actually measured in advance may be converted into the number of requests processible by each virtual server. Hence, even if physical servers to which virtual servers respectively belong differ in performance from each other, it is possible to select an appropriate virtual server as the request transfer destination.

3. Third Embodiment

In the third embodiment, at selection of a virtual server as the request transfer destination, the packet loss rate of the virtual server is not obtained. In place thereof, the CPU resource of the virtual server is directly converted into the number of requests processible by the virtual server, to thereby select one of the virtual servers as the request transfer destination. The request processing system of the third embodiment is similar in the physical configuration and the main logical configuration to that of the first embodiment.

In the virtual switch 40, the packet loss takes place in association with the CPU utilization of the overall physical server and the input packet rate of the physical server. Therefore, in place of the table keeping therein data items of the request processing numbers for various values of the CPU assignment rate of the virtual server and the packet loss rate of the virtual switch, a table keeping therein data items of the request processing numbers for various values of the CPU assignment rate of the virtual server and the CPU utilization of the physical server may be employed to obtain the number of requests processible by the virtual server. FIG. 16 shows a configuration of a request count conversion table 21b used according to the third embodiment. This table keeps therein the request processing count $R_C$ of a virtual server corresponding to the CPU assignment rate $C_A$ of the virtual server and the CPU utilization $C_P$ of the physical server to which the virtual server belongs. The load balancer 1 includes the request count conversion table for each AP server of the web system, namely, for each virtual server as a potential candidate of a request transfer destination.

In the third embodiment, a property management table 20b controls the input packet of the virtual switch and a phenomenon which occurs in the virtual switch in association with the input packet rate. Particularly, this table controls an input packet rate α at which a packet loss starts to take place in the virtual switch and an input packet rate β associated with the packet loss in the virtual switch, the packet loss resulting in the virtual switch performance limit for the virtual switch to stop the transfer of packets to the virtual server.

Figure 17:
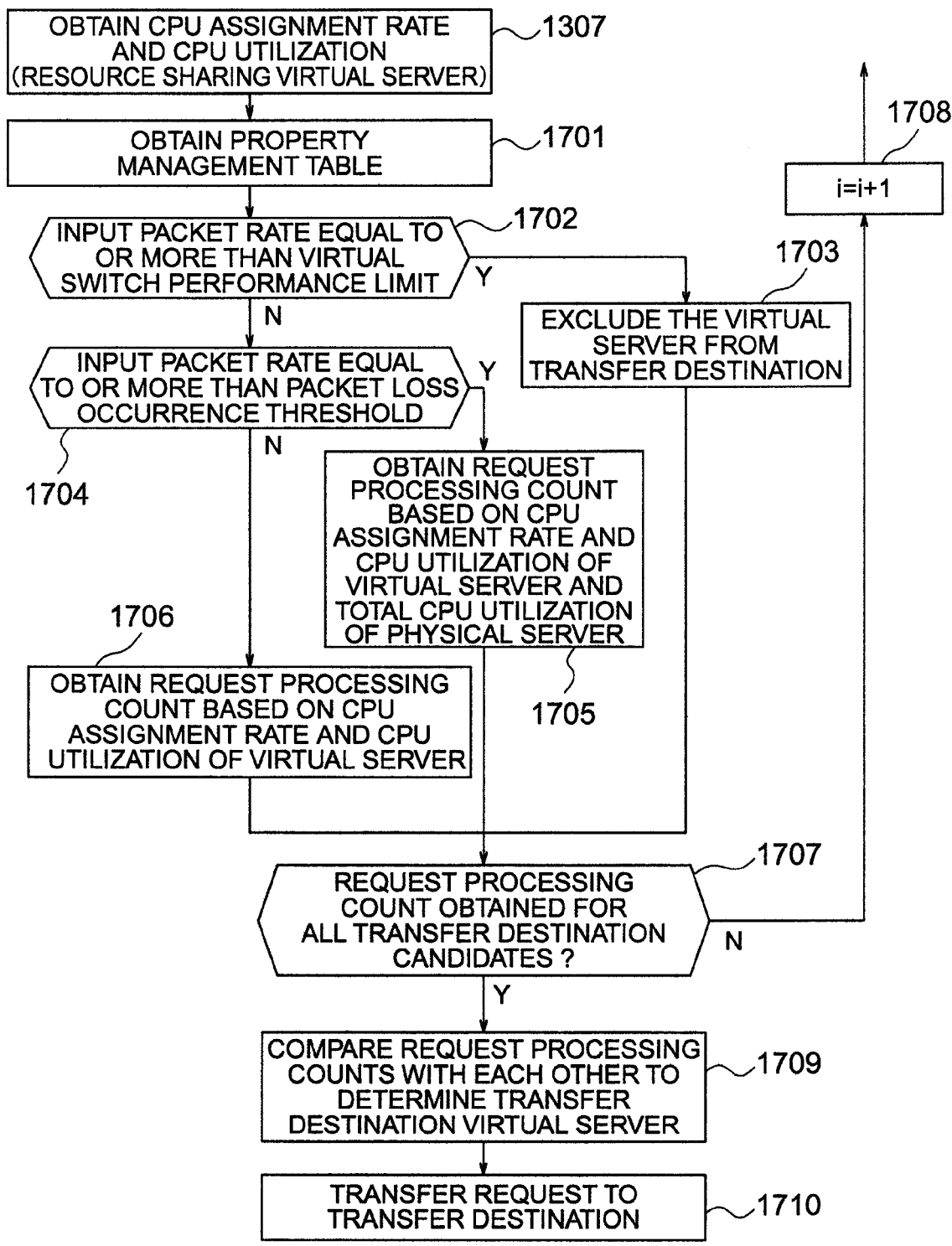
FIG. 17 is a flowchart showing server selecting process in the third embodiment.

Description will now be given of the server selection processing of the server selecting module 17 in the third embodiment. In the procedure to calculate an index for each virtual server as a transfer destination candidate, the server selection processing flow of this processing is substantially equal to that of the server selection processing of the first embodiment shown in FIG. 13 up to the processing (step 1307) to obtain the CPU assignment rate and the CPU utilization of the resource sharing virtual server. However, in step 1305, the CPU utilization of the physical server is also obtained in addition to the CPU assignment rate and the CPU utilization of the virtual server as the calculation target and the input packet rate of the physical server. The processing flow after step 1307 is unique to the third embodiment as shown in FIG. 17.

In step 1701, the property management table 20b is obtained. If the input packet rate of the physical server exceeds the performance limit β of the virtual switch (yes in step 1702), the virtual server coupled with the virtual switch is excluded from the request transfer destination candidates (step 1703).

If the input packet rate of the physical server exceeds the threshold α at which a packet loss takes place in the virtual switch (yes in step 1704), the request count conversion table 21b is referred to, to thereby obtain the request processing count processible by the virtual server based on the CPU assignment rate and the CPU utilization of the virtual server and the total CPU utilization of the physical server to which the virtual server belongs (step 1705). Specifically, the number of requests ($R_C$) processible by the virtual server is obtained from the request count conversion table 21b by identifying a column and a row based respectively on the CPU assignment rate $C_A$ of the virtual server and the CPU utilization $C_P$ of the physical server. The number of requests to be controlled by the request count conversion table 21b is the number of processible requests corresponding to the CPU assignment rate of the virtual server as in the request count conversion table 21 of the second embodiment. Next, the subtraction of expression (8) is conducted as follows to calculate the number of further processible requests $R_N$ of the virtual server in operation.

$$R_N = R_C - R_{PN} \quad (8)$$

wherein, $R_{PN}$ is the number of connections established between the load balancer and the virtual server as the calculation target. If the number of established connections $R_{PN}$ cannot be obtained, the request count conversion table 21b is referred to based on the CPU utilization $C_U$ of the virtual server and the CPU utilization $C_P$ of the physical server, to obtain the number of requests being processed by the virtual server. The number of requests thus obtained is used in place of $R_{PN}$ in expression (8). If the input packet rate of the physical server is equal to or less than the threshold α at which a packet loss starts to take place in the virtual switch (no in step 1704), the request count conversion table 21b is referred to so as to obtain therefrom the request processing count processible by the virtual server based on the CPU assignment rate and the CPU utilization of the virtual server (step 1706).

Description will be specifically given of the processing in step 1706. If the input packet rate of the physical server is equal to or less than the threshold α at which a packet loss occurs in the virtual switch, it is not required to take influence of the packet loss occurring in the virtual switch into consideration. That is, the CPU utilization of the physical server is not taken into consideration. Based on only the CPU assignment rate $C_A$ of the virtual server, the processible request count $R_C$ corresponding thereto is obtained. In this situation, it is assumed that only the virtual server as the calculation target uses the CPU resource of the physical server, namely, the CPU utilization $C_P$ of the physical server is substantially equal to the CPU assignment rate $C_A$ of the virtual server. Specifically, the request count conversion table 21b is referred to based on the values of $C_A$ for the column and the row, to obtain the number of requests $R_C$ processible by the virtual server. Next, as in step 1705, the number of connections $R_{PN}$ established between the load balancer and the virtual server as the calculation target is obtained to conduct the operation of expression (8), to thereby derive the number of requests $R_N$ which can be further processed by the virtual server. If the number of established connections $R_{PN}$ between the load balancer and the virtual server as the calculation target cannot be obtained, it is also possible that the request count conversion table 21b is referred to based on the CPU utilization $C_A$ of the virtual server for the column and the row, to obtain the number of requests being processed by the virtual server. The number of requests thus obtained is assigned to expression (8).

The processing to calculate the number of requests being processed by the virtual server as the calculation target is repeatedly executed until it is confirmed in step 1709 that the calculation is completely conducted for all transfer destination candidates. In step 1708, the candidate number i is updated in the loop. When the number of further processible requests $R_N$ is calculated for all transfer destination candidates, one of the virtual servers having the largest value of $R_N$ is selected as the destination of the request (step 1709). The request is transferred to the virtual server (step 1710).

As above, without predicting the packet loss rate of the virtual switch, the load balancer 1 directly compares the numbers of requests processible by the virtual servers with each other by use of the CPU resources respectively of the virtual and physical servers, to thereby transfer the request to the virtual server capable of processing a larger number of requests. Since the prediction of the packet loss rate of the virtual switch is not required, it is possible to lower the processing amount in the load balancer 1. Even if the load balancer does not include the unit to predict the packet loss rate of the virtual switch, it is possible to select, in consideration of the influence of the packet loss between the load balancer and AP servers, the virtual server capable of processing a larger number of requests.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A load balancer coupled to a physical server having a plurality of virtual servers operated by a virtual operating system in the physical server and a virtual switch connecting the virtual servers to an external device, the load balancer distributing requests to a plurality of virtual servers under control thereof, comprising:

a CPU;

a memory having a resource monitoring unit, a packet loss rate predicting unit, a server selecting unit and a resource management table; wherein the resource monitoring unit monitors, for the physical server, a CPU utilization of each of the virtual servers and a CPU utilization of the physical server;

the packet loss rate predicting unit predicts a packet loss rate of the virtual switch based on an input packet rate of packets inputted to the physical server, a first threshold that is an input packet rate at which a packet loss starts to occur, and a second threshold which is an input packet rate as a performance limit of the virtual switch;

the resource management table keeps therein, for each of the virtual servers, at least a CPU assignment rate set to the virtual server and designation of a second virtual server which shares a resource with the virtual server; and the server selecting unit selects one of the virtual servers to which the request will be transferred;

wherein the server selecting unit calculates, in the presence of a request to be transferred, for each of a plurality of transfer destination candidate virtual servers, an amount of the CPU resource available for the candidate virtual server based on a total of the CPU utilization of the candidate virtual server and the CPU utilization of the second virtual server designated to share the resource with the candidate virtual server and a total of the CPU assignment rate set to the candidate virtual server and a CPU utilization set to the second virtual server, when a predicted value of the packet loss rate is zero percent, sets an amount of the CPU resource available for the first virtual server to a surplus processing capacity, when the predicted value of the packet loss rate is greater than or equal to a predefined threshold, the candidate virtual server is excluded from the virtual servers for the selection of the transfer destination, when the predicted value of the packet loss rate is less than the predefined threshold, sets a value which is an amount of the CPU resource available for the candidate virtual server corrected with the packet loss rate to the surplus processing capacity, and selects one of the virtual servers to which the request is to be transferred, based on the surplus processing capacity.

2. A load balancer according to claim 1, wherein
the server selecting unit multiplies the available amount of the CPU resource predicted for each of the transfer destination candidate virtual servers by a reciprocal of the packet loss rate predicted for the virtual switch connecting to the transfer destination candidate virtual server, to thereby calculate processing capacity of each transfer destination candidate virtual server, and selects, based on the processing capacity thus calculated, one of the virtual servers to which the request is to be transferred.

3. A load balancer according to claim 1, wherein the packet loss rate predicting unit calculates the packet loss rate based on the CPU utilization of the physical server and an input packet rate of packets to be inputted to the physical server.

4. A load balancer according to claim 1, wherein the packet loss rate predicting unit keeps therein a correspondence between an input packet rate of packets to be inputted to the physical server, the CPU utilization of the physical server, and the packet loss rate occurring in the virtual switch, to thereby calculate the packet loss rate based on the correspondence.

5. A load balancer according to claim 1, wherein the packet loss rate predicting unit keeps therein a correspondence between an input packet rate of packets to be inputted to the physical server, the CPU utilization of the physical server, and the packet loss rate occurring in the virtual switch, and multiplies the packet loss rate obtained from the correspondence by a correction value associated with a current CPU utilization of the physical server, to thereby calculate the packet loss rate of the virtual switch.

6. A load balancer according to claim 1, wherein the server selecting unit calculates, based on the CPU assignment rate of the virtual server and the packet loss rate of the virtual switch calculated by the packet loss rate predicting unit, a request count of requests processible by the virtual server, and compares with each other the request counts thus calculated for the respective virtual servers of request transfer destination candidates, to thereby select one of the virtual servers to which the request is to be transferred.

7. A load balancer according to claim 1, wherein the server selecting unit calculates, based on the CPU assignment rate of the virtual server and the CPU utilization of the physical server, a request count of requests processible by the virtual server, and compares with each other the request counts thus calculated for the respective virtual servers of request transfer destination candidates, to thereby select one of the virtual servers to which the request is to be transferred.

8. A load balancing method for use in a request processing system comprising a physical server having a plurality of virtual servers operated by a virtual operating system in the physical server, a virtual switch connecting the virtual servers to an external device, and a load balancer disposed for distributing requests to the plurality of virtual servers operating in the physical servers, comprising the steps of:

beforehand keeping, for each of the virtual servers, setting of a CPU assignment rate and designation of a second virtual server which shares a resource with the virtual server;

monitoring, for the physical server, a CPU utilization of each of the virtual servers and a CPU utilization of the physical server;

predicting a packet loss rate of the virtual switch based on an input packet rate of packets inputted to the physical server, a first threshold that is an input packet rate at which a packet loss starts to occur, and a second threshold which is an input packet rate as a performance limit of the virtual switch;

in the presence of a request to be transferred, calculating, for each of a plurality of transfer destination candidate virtual servers, an amount of the CPU resource available for the candidate virtual server based on a total of the CPU utilization of the candidate virtual server and the CPU utilization of the second virtual server and a total of the CPU assignment rate of the candidate virtual server and a CPU utilization of the second virtual server;

when a predicted value of the packet loss rate is zero percent, setting an amount of the CPU resource available for the candidate virtual server to a surplus processing capacity, when the predicted value of the packet loss rate is greater than or equal to a predefined threshold, excluding the candidate virtual server from the virtual servers for the selection of the transfer destination, when the predicted value of the packet loss rate is less than the predefined threshold, setting a value which is an amount of the CPU resource available for the candidate virtual server corrected with the packet loss rate to the surplus processing capacity, and selecting one of the virtual servers to which the request is to be transferred, based on the surplus processing capacity.

* * * * *